Jan. 4, 1949. M. M. NEWMAN Re. 23,072

SHIRT COLLAR SHAPING DEVICE

Original Filed May 10, 1946

INVENTOR
Max M. Newman
BY
S. Stephen Baker
ATTORNEY

Reissued Jan. 4, 1949

Re. 23,072

UNITED STATES PATENT OFFICE 23,072

SHIRT COLLAR SHAPING DEVICE

Max M. Newman, New York, N. Y., assignor of one-half to Victor Newman, New York, N. Y.

Original No. 2,426,519, dated August 26, 1947, Serial No. 668,887, May 10, 1946. Application for reissue October 24, 1947, Serial No. 781,884

16 Claims. (Cl. 2—132)

This invention relates to the shaping of shirt collars and more particularly to shaping or forming means for the collar edge so as to prevent wrinkling and provide a neat appearance thereof.

This application is a continuation in part of my application Serial No. 636,918, filed December 27, 1945. In that application I disclosed a combined shaping and stiffening element wherein the element was suitably rigid during a portion of its length for transmitting such rigidty to a porton of the collar edge while a flexible portion of the element was provided to permit of its being draped over a tie knot adjacent the collar edge.

It is an object of the present invention to provide an improvement of the collar shaping means described in my previous application in that the article will be more easily and simply constructed and will present various economies in the manufacture thereof.

Another object of this invention is to produce a collar shaping means which will inflict less wear on both shirt collars and shirt bosoms so as not to shorten the life of the shirt unduly.

Still another object of my invention is to provide a collar forming means which may bend so as to adapt itself to the shape of an adjacent tie knot but in which bending in the opposite direction is prevented. It can be seen, therefore, that the flexibility of the collar shaper or former is limited to conditions where it is useful so that the collar cannot take an opposite bend where it might jut out from the shirt front at a large angle.

Other objects of my invention will be apparent from the following description, it being understood that the above general statements of the objects of my invention are intended to describe and not limit it in any manner.

Figure 1:
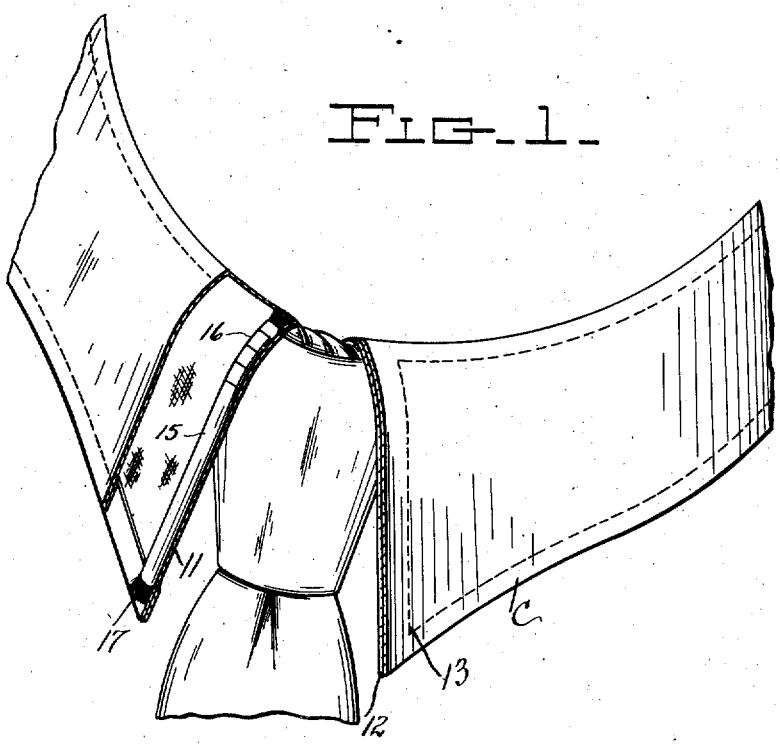
Fig. 1 is a perspective view, partly broken away, of a collar and tie assembly, the collar being provided with the shaping means of the instant invention.
Figure 2:
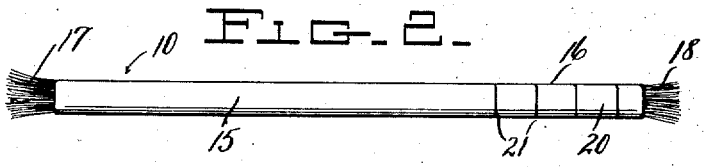
Fig. 2 is an elevational view of the shaping element per se.
Figure 3:
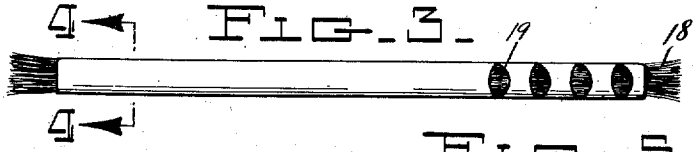
Fig. 3 is a view similar to Fig. 2 and illustrating the reverse side of the shaping element.

The collar C is of the well known turned-down type provided with the conventional "French" seams at its edges. The elongated shaping elements 10 are incorporated between the plies of the collar adjacent the edges 11 and 12 thereof. It will be apparent that the seam 13 in conjunction with the French seam at the edge 12 provides a channel into which the shaping element 10 may be inserted. A similar condition exists in the broken away portion of Fig. 1. Such insertion may be effected in the manufacture of the collar so that the element 10 is permanently incorporated in said channel or an opening may be provided in the collar adjacent the neckline whereby the element 10 can be inserted or removed as desired.

The shaping element 10 comprises sections having varying degrees of flexibility. Section 15 thereof is proportioned and disposed so as to occupy the central and principal portion of the collar edge as illustrated in Fig. 1. Section 16 is of a relatively flexible nature and is proportioned and disposed so as to control the top or neckline portion of the collar edge. Extension sections 17 and 18 are integral with a unitary strip 19 which is preferably, but not necessarily, of a fabric material received within the section 15 as will hereinafter be described.

Section 15 is of a tubular rigid plastic or metal material such as copper, brass or, indeed, any metallic material. Section 16 is formed of a series of discrete, rigid, ring-like members 20 which give the section 16 the characteristics of a chain. Members or links 20, however, are interconnected only by virtue of the flexible strip 19 around which the members 20 are clamped. Since they are discrete, however, the section 16 may bend relative to the section 15 by virtue of the flexibility of strip 19. Members 20 are so formed that the bending of section 16 relative to section 15 is permitted in one direction and resisted in another direction. Thus, one side of section 16 has its members 20 formed with coextensive and adjacent edges which mutually resist bending in that direction. On the other hand, the opposite side of section 16 has the adjacent edges of members 20 cut out so as not to impose a physical barrier against bending. Accordingly, section 16 can bend inwardly as illustrated in Fig. 1, but cannot bend in a reverse direction whereby the collar edge is restrained against an objectionable jutted out position.

The strip 19 extends from both ends of the shaping element comprising sections 15 and 16. The extension 17 lends a soft tip to the structure so as to avoid damage to a shirt front and to screen or absorb the edge of the metal shaping section 15. Extension section 18 serves in a similar capacity for the top end of the shaping element.

Strip 19 may comprise a stranded fabric material such as an ordinary wick. It will be found that the extension members 17 and 18 will form a soft protective tip against the edges of the metallic sections as hereinbefore described.

Figure 4:
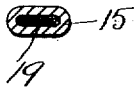
Fig. 4 is a section along the line 4—4 of Fig. 3.

The assembly and construction of the device are particularly simple. It is desirable to first select a metal tube which is of round cross section and then thread a suitable length of strip 19 therethrough so that it extends past both ends of the tube. The tube may then be filed as by a triangular metal file, to form the concave undersides of members 20 whereby they will be permitted to bend in that direction when the device is completed. Of course, these concave undersides may be formed in the tube in advance of the strip insertion. The tube may then be flattened out, as by a hammer, until it assumes the shape indicated by Fig. 4 whereby the strip 19 is clamped and secured within the tube so as to be substantially unremovable therefrom. The members 20 may then be bent so as to produce the breaks or sides 21 and form discrete members thereof, which lend such a degree of limited rigidity to the section 16 as to permit of its being draped over a tie knot as illustrated in Fig. 1 while retaining sufficient rigidity to serve as shaping means for the collar edge. It is obvious, of course, that instead of bending operations to form the members 20, they may be sawed or filed, as desired. In fact, the members 20 may be individually threaded on the strip 19 and thereafter clamped or otherwise maintained in position.

The unitary strip 19 not only serves to maintain the members 20 in proper position so as to prevent either their movement or escape but it also provides the extensions 17 and 18 for the purposes set forth. The unitary strip 19 also serves to maintain the integrity of section 15 in the event that it is broken during laundering or ironing as is quite possible. Unless such a strip were provided, breaking of section 15 would cause the broken parts to fall or otherwise become displaced in the collar edge channel so that the shirt might become seriously damaged or no longer desirable for wear. The assembly of the instant device is extremely simple and economical while its construction is such as to fulfill substantially all the shaping requirements of a collar edge. The uni-directional bending characteristics of section 16 are, of course, not essential to the practice of the invention, but they serve as an additional safeguard against distortion. Similarly, the tubular construction of section 15 throughout its length is unnecessary and the flexible extensions 17 and 18 may be individual or independent strips, both or either of which may be used as desired. They may be connected as by the clamping method shown or by a suitable adhesive such as an adhesive connection of canvas strip to spring steel. The extension 18 functions as a hinge in swingably connecting the section 16 to the section 15, thus enabling the section 16 to perform its shaping functions.

Figure 5:
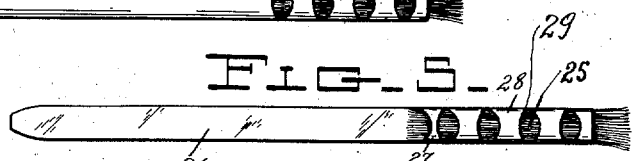
Fig. 5 is a modified embodiment.

In the embodiment of Fig. 5, the flexible strip 25 is secured at one end of the body portion 26. Body portion 26 is a thin flat length of metallic material, preferably a resilient spring steel having a normally straight configuration, although a heat resistant plastic material may be used. Body 26 has an integral clamping band 27 which secures the strip 25 thereto. The ring-like members 28 are similar to the members 20. The device shown in Fig. 5 may be constructed by providing a flat length of metal with a tubular end, forming the concave undersides 29 therein, inserting the strip 25 through the tubular end, flattening the tube to secure the strip, and finally breaking or otherwise separating the flattened tubular end into separator ring-like members. It will be found that the concave undersides have a curving effect on the ringed section which conforms more or less to the shape it will assume when installed in a collar. The flattened tubular end being thicker than the single thickness of body 26 serves as a stabilizing or supporting influence against downward movement of the device in the collar seam. In this embodiment, a user may cut off whatever portion of body 26 that is excessive so that the over-all length of the device may be adjusted to suit a particular length of collar edge.

I have shown a preferred embodiment of my invention, but it is obvious that numerous changes and omissions may be made therefrom without departing from its spirit.

I claim:

1. Collar shaping means comprising a hollow, elongated section of rigid material adapted to be received adjacent to and shape a shirt collar edge, flexible, soft means extending from at least one end of said section, and discrete, rigid members supported by the extending portion of said flexible means so as to lend a degree of rigidity thereto.

2. Collar shaping means comprising a hollow, elongated section of rigid material adapted to be received adjacent to and shape a shirt collar edge, flexible, soft means extending from at least one end of said section, and discrete, rigid members supported by said flexible means so as to lend a degree of rigidity thereto, said rigid members being so formed as to be bendable as a unit in one direction only, said flexible means being operative to connect said rigid members and permit such bending.

3. Collar shaping means comprising a hollow, elongated section of rigid material adapted to be received adjacent to and stiffen a shirt collar edge, a flexible strip received within said hollow and extending from both ends of said section, and a series of discrete rigid members supported by the flexible extension at one end of said section.

4. Collar shaping means comprising a hollow, elongated section of metallic material, a fabric strip received within said hollow and clamped therein by said section, said fabric strip extending from both ends of said section, and a series of discrete, rigid members supported by one end of said fabric strip, said fabric strip extending past said rigid members whereby said collar shaping means is provided with soft tips at both ends thereof.

5. Collar shaping means according to claim 4 wherein said discrete members comprise metallic rings clamped on said fabric strip.

6. Collar shaping means according to claim 4 wherein said discrete rigid members comprise metallic rings clamped around said fabric strip and having cut away adjacent sides permitting flexibility in one direction whereby said collar shaping means may bend in the region of said rigid members in said one direction.

7. Collar shaping means comprising a hollow, elongated section of metallic material, a fabric strip received and clamped in the hollow of said section and extending from both ends thereof, and a series of discrete metallic rings separated from said section and clamped over one end of said fabric strip so as to lend a degree of rigidity thereto, said discrete rings being bendable as a unit in one direction and being so formed as to resist bending in an opposite direction, said fabric strip extending past said discrete metallic rings so as to furnish a soft tip for such end of the shaping means while the other end or extension of said fabric strip furnishes a soft tip for the other end of the shaping means.

8. Collar shaping means comprising an elongated member of rigid material adapted to be retained adjacent to, and shape a shirt collar edge, a relatively soft, flexible member connected to said elongated member so as to extend from at least one end thereof, and rigid means connected to the extending portion of said flexible member, said extending portion serving as a hinge between said elongated member and said rigid means whereby said rigid means may be bent relative to said elongated member so as to permit of its being draped over a tie knot adjacent to said shirt collar.

9. Collar shaping means comprising a flat elongated body member of normally straight configuration, a length of flexible fabric material secured at one end of said body member, and discrete, rigid members connected to said fabric material.

10. Collar shaping means comprising an elongated section of rigid material adapted to be received adjacent to and shape a shirt collar edge, a series of discrete and rigid rings having flexible connections between them and having an overall flexibility so as to permit said series of rigid rings to drape over curved surfaces by the flexibility of said connections, and hinge means connecting said elongated section and said series of discrete rigid rings.

11. Collar shaping means comprising a flat, elongated body member of normally straight configuration, a length of flexible material secured at one end of said body member and a chain-like series of discrete rigid members secured to said flexible material, each of said discrete members being flexibly connected to each other.

12. Collar shaping means according to claim 11 wherein said discrete members are so flexibly interconnected as to be bendable in one direction and resist bending in the opposite direction.

13. Collar shaping means according to claim 12 wherein said discrete rigid members comprise rings formed around and maintained by said flexible material, said rings having their undersides cut away where they approach adjacent rings so as to permit the series of discrete members to bend in the direction of said cut away undersides, the edges of adjacent discrete members on their top sides being co-planar and substantially contacting so as to resist bending in the direction of their top sides.

14. Collar shaping means comprising a flattened elongated body member of rigid material for stiffening a collar edge, and a fabric strip clamped within and extending throughout the length of said body member.

15. Collar shaping means comprising a flattened tubular rigid, metallic body member of elongated form for stiffening a collar edge, and a fabric strip clamped within the tubular member through the flattened formation thereof, said fabric strip extending throughout the length of said body member and past both ends thereof.

16. Collar shaping means comprising a flattened, elongated body member of rigid, frangible metallic material for stiffening a collar edge, and a fabric strip enclosed and clamped within by said flattened body member so as to extend throughout the length of said body member, said fabric strip further extending past at least one end of said body member.

MAX M. NEWMAN.

REFERENCES CITED

The following references are of record in the file of this patent:

UNITED STATES PATENTS

| Number | Name | Date |
|---|---|---|
| 1,021,916 | Caspary | Apr. 2, 1912 |

FOREIGN PATENTS

| Number | Country | Date |
|---|---|---|
| 2,025 | Great Britain | Jan. 26, 1910 |